United States Patent
Blunier

(10) Patent No.: US 10,285,321 B2
(45) Date of Patent: May 14, 2019

(54) PIVOTING BEARING ASSEMBLY

(71) Applicant: CNH Industrial America LLC, New Holland, PA (US)

(72) Inventor: Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 168 days.

(21) Appl. No.: 15/232,187

(22) Filed: Aug. 9, 2016

(65) Prior Publication Data

US 2018/0042164 A1    Feb. 15, 2018

(51) Int. Cl.
    *A01B 29/06*    (2006.01)
    *F16C 17/02*    (2006.01)
    *F16C 11/04*    (2006.01)
    *A01B 29/04*    (2006.01)

(52) U.S. Cl.
    CPC ............ *A01B 29/06* (2013.01); *A01B 29/048* (2013.01); *F16C 11/04* (2013.01); *F16C 17/02* (2013.01); *F16C 2310/00* (2013.01)

(58) Field of Classification Search
    CPC ....... A01B 29/00; A01B 29/04; A01B 29/046; A01B 29/048; A01B 29/06; Y10T 403/32951; Y10T 403/32959; Y10T 403/32967; Y10T 403/75
    See application file for complete search history.

(56) References Cited

U.S. PATENT DOCUMENTS

| | | | | |
|---|---|---|---|---|
| 1,094,201 A | * | 4/1914 | Dunham | ................ A01B 29/04 172/187 |
| 2,388,954 A | * | 11/1945 | Corliss | ...................... E04B 1/48 403/408.1 |
| 2,707,425 A | | 5/1955 | Charley | |
| 2,721,432 A | | 10/1955 | Machovec | |
| 3,835,615 A | * | 9/1974 | King, Jr. | ................. B23P 9/025 248/909 |
| 3,892,278 A | | 7/1975 | Smith et al. | |
| 4,044,841 A | | 8/1977 | Smith et al. | |
| 4,271,911 A | * | 6/1981 | van der Lely | ....... A01B 29/048 172/558 |

(Continued)

FOREIGN PATENT DOCUMENTS

| | | |
|---|---|---|
| DE | 76 30 093 | 1/1977 |
| DE | 28 56 166 A1 | 7/1980 |

OTHER PUBLICATIONS

"Soil Conditioning as Good as It Gets", Unverferth Seedbed Tillage, Unverferth Manufacutring Co., 2013 (8 pages).

*Primary Examiner* — Matthew D. Troutman
(74) *Attorney, Agent, or Firm* — Rebecca L. Henkel; Rickard K. DeMille

(57) ABSTRACT

A sleeve type bushing/bearing is assembled/pressed into a pivoting frame structure. This bearing runs on a spindle tube which is bolted rigidly to a support arm structure. The support arm structure supports the outside diameter of the spindle tube and well as clamping to the end face of the spindle tube. This support eliminates most of the shear load from being applied at the joint face to the bolt outside diameter. The larger outside diameter of the spindle tube can support more shear force through the joint allowing greater functional pressure to be applied through the joint without failure. The Joint can be easily assembled and disassembled in multiple configurations and for replacement of worn parts if needed and includes a sleeve type bearing which is maintenance free and requires no greasing or other lubrication.

13 Claims, 4 Drawing Sheets

(56) References Cited

U.S. PATENT DOCUMENTS

| | | | |
|---|---|---|---|
| 4,461,358 A | | 7/1984 | Lewison |
| 4,519,325 A | * | 5/1985 | Miller ............... A01O 5/06 |
| | | | 111/164 |
| 4,905,771 A | | 3/1990 | Stark |
| 5,333,896 A | | 8/1994 | Creighton |
| 5,601,274 A | | 2/1997 | Minor et al. |
| 5,957,217 A | * | 9/1999 | Gunnink ............ A01B 35/16 |
| | | | 172/166 |
| 7,073,949 B2 | | 7/2006 | Ruckle et al. |
| 7,121,758 B2 | * | 10/2006 | McMillan ........... F01D 21/045 |
| | | | 403/408.1 |
| 7,987,917 B1 | * | 8/2011 | Kornecki ........... A01B 49/027 |
| | | | 172/184 |
| 8,714,943 B2 | * | 5/2014 | Bahmata ............ F01C 21/007 |
| | | | 403/365 |
| 9,003,982 B1 | * | 4/2015 | Elizalde ............. A01B 49/027 |
| | | | 111/155 |
| 2003/0159840 A1 | | 8/2003 | Schmidt, Jr. |
| 2007/0169950 A1 | | 7/2007 | Grieshop |
| 2011/0030979 A1 | | 2/2011 | Kovach et al. |
| 2013/0062084 A1 | * | 3/2013 | Casper ............... A01B 29/048 |
| | | | 172/540 |
| 2014/0209335 A1 | * | 7/2014 | Casper ............... A01B 5/04 |
| | | | 172/260.5 |
| 2014/0262373 A1 | * | 9/2014 | Landoll .............. A01B 33/02 |
| | | | 172/260.5 |
| 2015/0314805 A1 | * | 11/2015 | Hoyer ................ B62D 7/18 |
| | | | 403/53 |
| 2017/0020057 A1 | * | 1/2017 | Westlind ............ A01B 33/142 |
| 2017/0034990 A1 | * | 2/2017 | Casper ............... A01B 5/04 |
| 2017/0049037 A1 | * | 2/2017 | Hilvers .............. A01B 49/027 |

* cited by examiner

PIVOTING BEARING ASSEMBLY

BACKGROUND OF THE INVENTION

1. Field of the Invention

The present invention relates to agricultural tillage equipment, and, more particularly, to a bearing structure for a rolling basket or similar implement.

2. Description of the Related Art

As a standalone implement or coupled with some other implement, a reel having a plurality of blades for breaking clods into smaller sizes and chopping up the debris still remaining on the top of the soil, known as a crumbler or rolling basket, is frequently used. The roller basket arrangement can be used to roll behind the rows of tines of a harrow, to flatten the ridges left by the tines and move the residual crop material into the soil to enhance contact with the soil. The roller basket is used to provide a firm, level field with coarse soil on top that resists crusting, with the finer soil particles at planting depth for optimum seed-to-soil contact. The downward pressure on the basket controls the depth of the blades.

The use of tandem sets of rolling baskets is becoming increasingly popular. For example, a pair of roller baskets may be suspended for rotation about generally parallel axes on a common truck and that truck, in turn, pivotably suspended from the implement frame. With such an arrangement, the sum of the downward forces supplied to the individual roller baskets must be born by the pivotal joint between the truck and the frame. This leads to the requirement for a sturdy maintenance free pivoting joint for pivoting/walking double basket assemblies that is easily assembled and disassembled.

What is needed in the art is a technique for relieving certain shear stresses to which a pivotal joint fastener may be subjected.

SUMMARY OF THE INVENTION

The present invention provides shear stress relief on a pivotal joint fastener by shifting at least a portion of the stresses to an adjoining member.

The invention in one form is directed to a pivotal coupling arrangement joining a relatively fixed support arm and a framework or truck of a rolling basket assembly. The pivotal coupling includes a central threaded fastener passing into the two members and defining therebetween a pivot axis. A spindle surrounds a portion of the central fastener and has a generally cylindrical outer surface. There is a sleeve bearing intermediate the spindle and framework. The spindle spans the region between the support arm and framework whereby at least a portion of any shear stress between the support arm and framework is assumed by the spindle. The spindle may extend axially part way through the support arm or the support arm may include a weldment or other extension into which the spindle extends.

The invention in another form is directed to an agricultural tillage implement including a rolling basket assembly having a pivot framework near each end thereof. A pair of relatively fixed support arms depend from the implement and a pair of coupling arrangements, each pivotally coupling a support arm and corresponding basket pivot framework, suspend the basket assembly from the support arm. Each coupling arrangement includes a central fastener joining a support arm and pivot framework. There is a spindle coaxial with a portion of the central fastener which has a generally cylindrical outer surface. A sleeve bearing lies intermediate the spindle and support arm with the spindle spanning the region between the spindle and support arm whereby at least a portion of any shear stress therebetween is assumed by the spindle.

In a further form of the invention, an agricultural tillage implement for engaging and smoothing soil, includes a rolling basket assembly, a support arm, and a pivotable coupling between the rolling basket assembly and support arm for suspending the rolling basket assembly juxtaposed with the support arm. The pivotable coupling includes a sleeve bearing, a spindle and a fastener with the spindle spanning the region between the support arm and basket assembly whereby at least a portion of any shear stress between the rolling basket assembly and the support arm is assumed by the spindle.

An advantage of the present invention is use of a maintenance free sleeve type bearing assembly which allows easy assembly and disassembly, and eliminates shear loading through the attaching bolt.

Another advantage is shear stress formerly born by a pivotal connector is shifted to other components of the assembly.

Yet another advantage is shear load through a pivot joint is taken through the thickest portion of a spindle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate two embodiments of the invention and such exemplifications are not to be construed as limiting the scope of the invention in any manner.

DETAILED DESCRIPTION OF THE INVENTION

Figure 1:
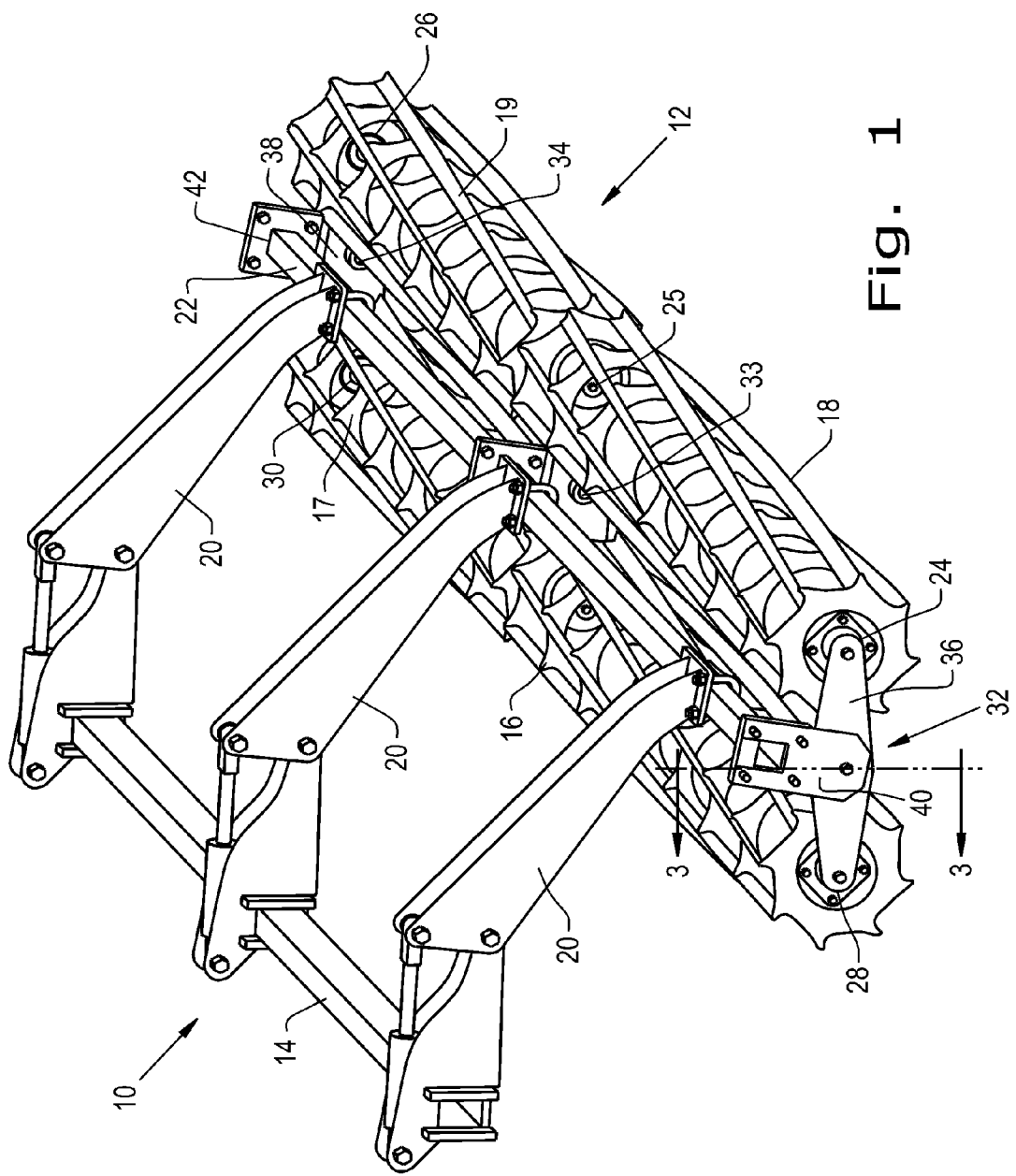
FIG. 1 is an isometric view of a portion of an agricultural implement having a tandem rolling basket assembly incorporating the invention in one form.
Figure 2:
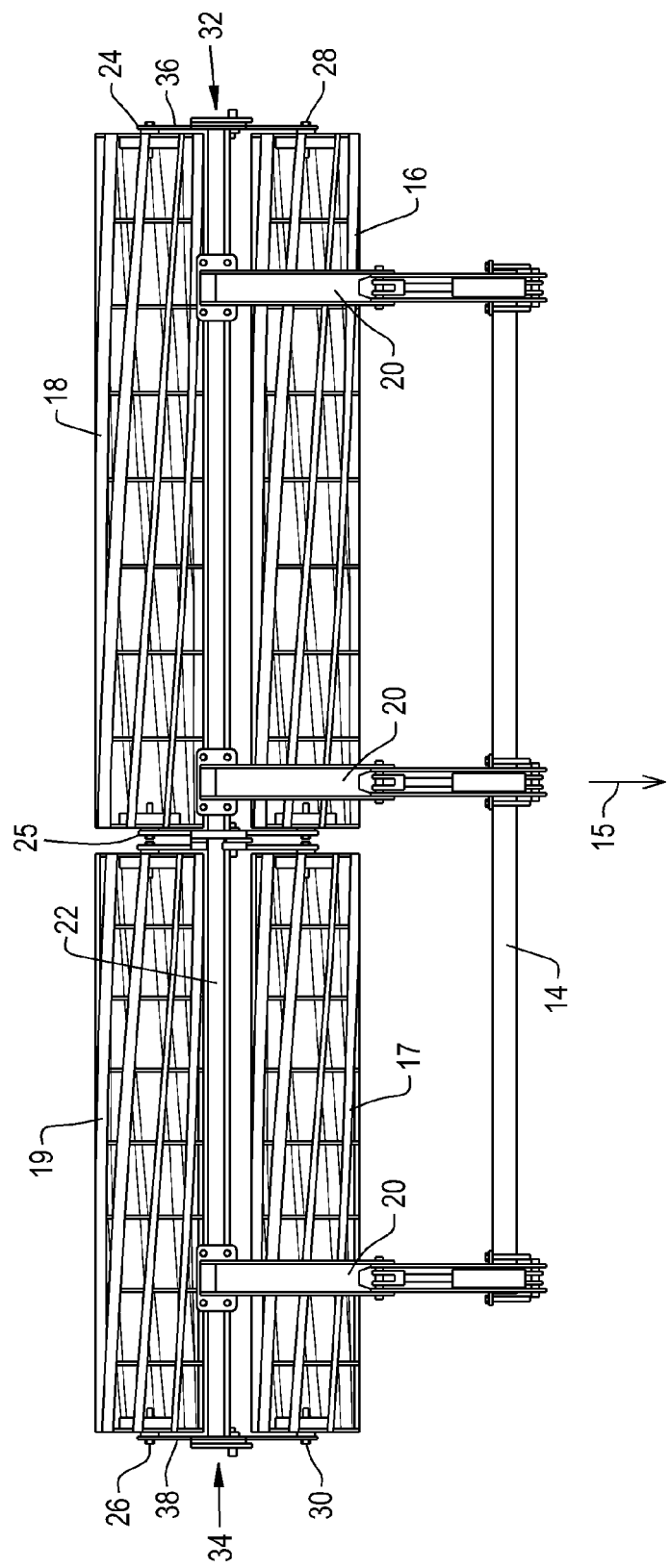
FIG. 2 is a top plan view of the implement portion of FIG. 1.

Referring now to the drawings, and more particularly to FIG. 1, there is shown an embodiment of a tillage implement 10 of the present invention. Tillage implement 10 includes a rolling basket assembly 12 connected to a frame member 14 of implement 10. Frame 14 is part of tillage implement 10 that is towed, as indicated by arrow 15, by a traction unit, such as by an agricultural tractor (not shown).

Rolling basket assembly 12 may be one of several tillage assemblies connected to frame 14, which collectively may be thought of as an auxiliary implement for finishing the soil. The auxiliary implement may include a spring tooth drag (not shown) and one or more rolling basket assemblies which act to finish the soil. Two sets of similar baskets 16 and 17, and 18 and 19 are illustrated, however dissimilar baskets such as one for breaking up soil clumps and another for smoothing or leveling the soil may be employed. One or both baskets may, instead, be different rotating type tilling implements.

Rolling basket assembly 12 has positioning arms 20, a sub frame 22, and a pair of bearing assemblies for each basket. Bearing 24 supports one end of basket 18. There is a middle support arm providing bearing 25 to support the opposite end of basket 18. Similarly, bearing 26 supports one end of basket 19, bearing 28 supports one end of basket 16 and bearing 30 supports one end of basket 17. Additionally, there is a pair of pivot couplings 32 and 34 suspending pivot framework ends 36 and 38 from the support arms 40 and 42.

The basket bearing assemblies establish an axis of rotation 44 for basket 16 and 17, and another axis of rotation 46 for baskets 18 and 19. The pivotal couplings 32 and 34 establish a pivotal axis 48 for the truck or pivot framework 36, 38 which extends generally parallel to axes 44 and 46 and allows upward motion of one basket and the correlative downward motion of the other basket. The middle support arm includes similar pivotal couplings such as 33. The details of the pivotal couplings is shown for a representative coupling 32 in FIGS. 3-6.

Figure 3:
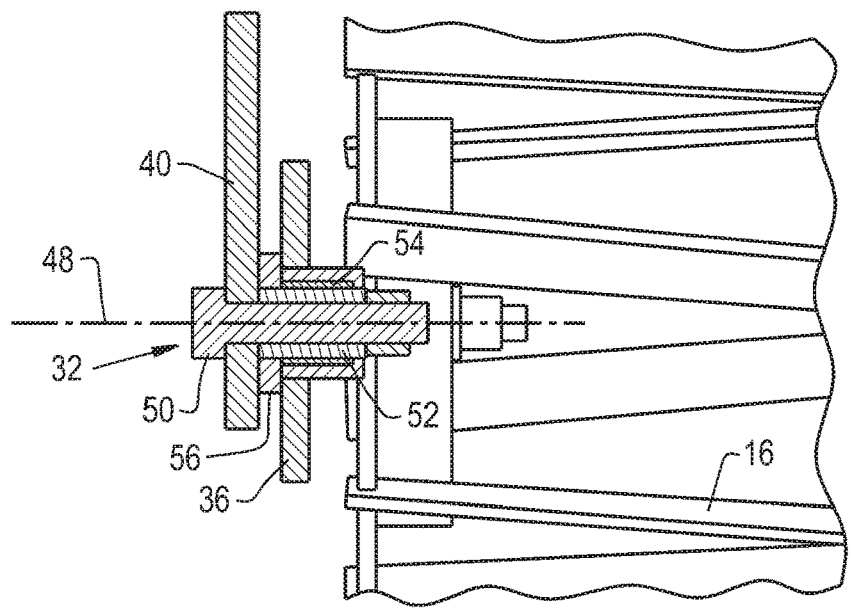
FIG. 3 is a partial cross-sectional view along lines 3-3 of FIG. 1 illustrating the bearing structure.

In FIG. 3, the generally planar faces of support arm 40 and pivot framework 36 are held in juxtaposition by a suitable central fastener such as the spindle bolt 50. Without more, shear stress concentrated generally along the planar faces and perpendicular to the pivotal axis 48 would all be born by the bolt 50. At least part of the shear stress is shifted to another member in the form of the spindle 52 to provide a more sturdy construction.

Figure 4:
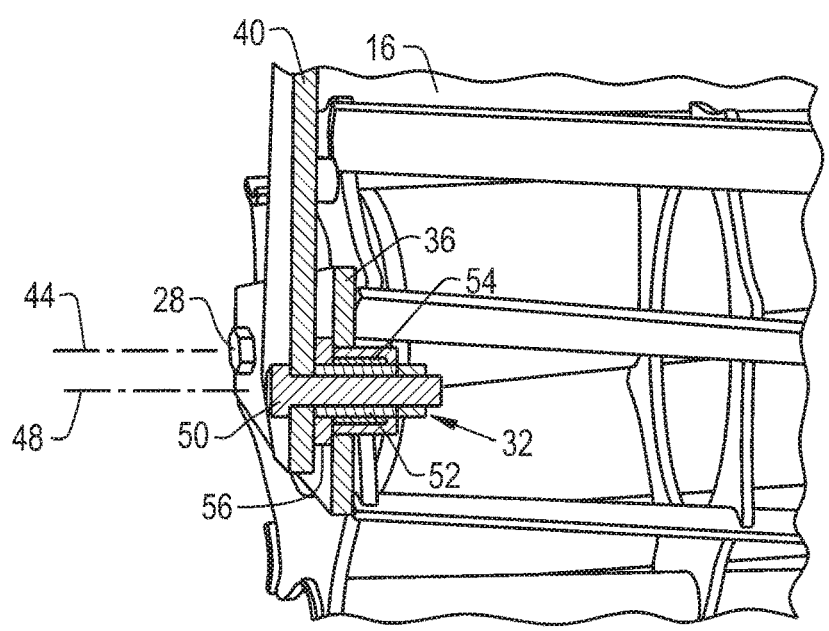
FIG. 4 is an isometric view of the structure of FIG. 3.

In FIGS. 3 and 4, the, entire bearing structure of the pivot coupling 32 is seen to include the spindle 52 which is formed as a hollow cylindrical shell. The spindle 52 outer cylindrical surface receives a sleeve bearing 54. Sleeve bearing 54 is received in the pivot framework 36. Note that the support arm 40 has a rigid weldment 56 on its inner face which receives one end of the spindle 52. With the weldment supporting the spindle, shear forces between support arm 40 and pivot framework 36 are now born primarily by the spindle. A similar result is achieved with the structure of FIGS. 5 and 6.

Figure 5:
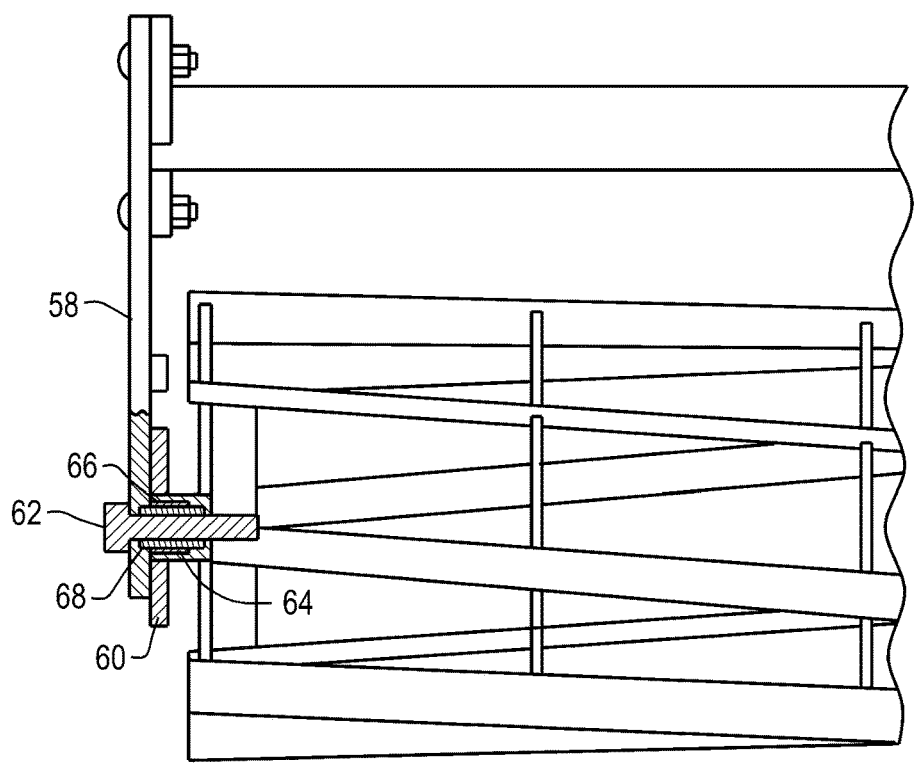
FIG. 5 is a partial cross-sectional view along lines 3-3 of FIG. 1 showing a variation on the bearing structure.
Figure 6:
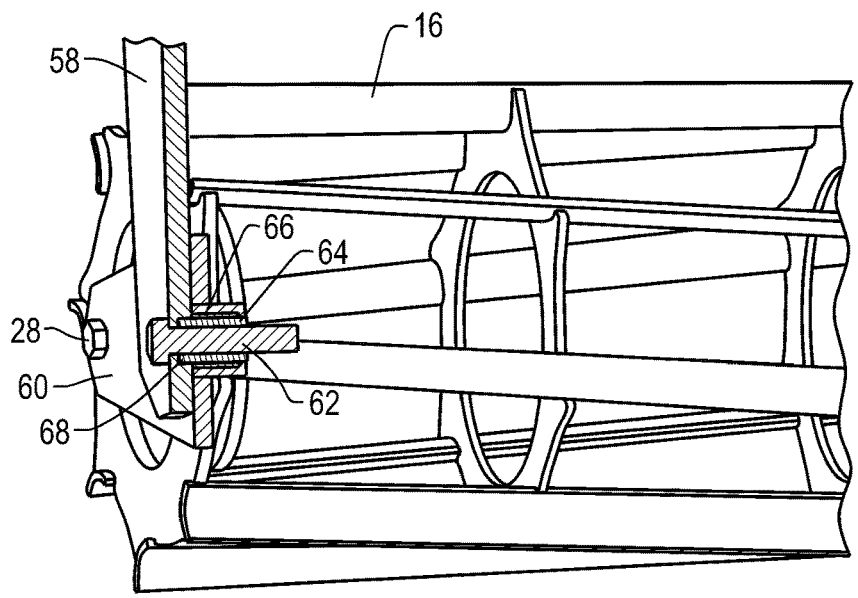
FIG. 6 is an isometric view of the variation of FIG. 5.

FIG. 5 shows a support arm 58, pivot framework 60, and spindle bolt 62, however, there is no weldment. Rather, the support arm has a counterbored hole 68 which supports the outside diameter of the spindle 64. As before, sleeve bearing 66 surrounds the spindle 64. The counterbored hole 68 is best seen in FIG. 6 where the left end of spindle 64 is seated rigidly within the support arm.

In each of the disclosed embodiments, the spindle spans the region between the support arm and the pivot framework so that at least a portion of any shear stress between the two members is assumed by the spindle.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pivotal coupling arrangement, comprising:
   a first relatively fixed member having a first planar surface, the first member comprises a support arm of an agricultural tillage implement;
   a second member pivotally movable relative to the first member, the second member having a second planar surface in juxtaposition with the first planar surface;
   a pivotal coupling between the first and second members, including a central fastener passing into the two members and defining therebetween a pivot axis;
   a spindle surrounding a portion of the central fastener and having a generally cylindrical outer surface, a first end, and a second end, and the first end of the spindle is fixedly connected to and supported by the first member and axially spaced apart at a distance from the second planar surface of the second member; and
   a sleeve bearing intermediate the spindle and second member, the sleeve bearing having a first end and a second end, the first end of the sleeve bearing is coplanar with the second planar surface of the second member, and the spindle spanning the region between the first and second members whereby at least a portion of any shear stress between the two members generally along the first and second planar surfaces is assumed by the spindle.

2. The arrangement of claim 1, wherein the spindle extends axially part way through the first member.

3. The arrangement of claim 1, wherein the first member includes a weldment into which the spindle extends.

4. The arrangement of claim 1, wherein the central fastener comprises a threaded fastener extending completely through both members.

5. The arrangement of claim 1, wherein the second member is a framework of a rolling basket assembly of an agricultural tillage implement.

6. The arrangement of claim 1, wherein the stress between the two members is generally perpendicular to the pivot axis.

7. An agricultural tillage implement, comprising:
   a rolling basket assembly including a pivot framework near each end thereof, each pivot framework having a planar surface;
   a pair of relatively fixed support arms depending from the implement, each support arm having a planar surface;
   a pair of coupling arrangements, each pivotally coupling a support arm and corresponding basket pivot framework to thereby suspend the basket assembly from the support arms, each coupling arrangement including:
   a central fastener joining a support arm and pivot framework and defining a pivot axis therebetween;
   a spindle coaxial with a portion of the central fastener and having a generally cylindrical outer surface, a first end, and a second end, and the first end of the spindle is fixedly connected to and supported by a respective support arm and axially spaced apart at a distance from a respective planar surface of a respective pivot framework; and
   a sleeve bearing intermediate the spindle and the pivot framework, the sleeve bearing having a first end and a second end, the first end of the sleeve bearing is coplanar with the second planar surface of the second member, and the spindle spanning the region between the pivot framework and support arm whereby at least a portion of any shear stress therebetween generally along the juxtapositioned planar surface of the pivot framework and the planar surface of the support arm is assumed by the spindle.

8. The agricultural tillage implement of claim 7, wherein the central fastener comprises a threaded fastener extending completely through the support arm and pivot framework.

9. The agricultural tillage implement of claim 7, wherein the sleeve bearing comprises a cylindrical shell coaxial with both the spindle and the central fastener.

10. The agricultural tillage implement of claim 7, wherein the spindle and central fastener are fixed relative to the support arm and the bearing facilitates pivotal motion of the pivot framework relative to the support arm.

11. The agricultural tillage implement of claim 7, wherein the spindle extends axially part way through the support arm.

12. The agricultural tillage implement of claim 7, wherein the support arm includes a weldment into which the spindle extends.

13. The agricultural tillage implement of claim 7, wherein the rolling basket assembly comprises a tandem pair of rolling baskets having rotational axes generally parallel to and displaced from the pivot axis.

* * * * *